United States Patent

Jones

Patent Number: 5,312,087
Date of Patent: May 17, 1994

[54] LOW TORQUE BACK SEATING STEM FOR GATE VALVE

[75] Inventor: Taylor L. Jones, Houston, Tex.

[73] Assignee: FMC Corporation, Chicago, Ill.

[21] Appl. No.: 91,091

[22] Filed: Jul. 12, 1993

[51] Int. Cl.$^5$ .................................. F16K 41/14
[52] U.S. Cl. .................................. 251/330; 251/214; 137/315
[58] Field of Search .................... 251/330, 214; 137/315

[56] References Cited

U.S. PATENT DOCUMENTS 2,924,233  2/1960  Michaels ........................ 251/330 X
3,412,750  11/1968  Volpin .......................... 251/330 X
4,149,558  4/1979  McGee et al. ................... 251/330 X Primary Examiner—Arnold Rosenthal
Attorney, Agent, or Firm—Lawrence Cruz; Richard B. Megley

[57] ABSTRACT

A gate valve adapted for stem back seating has a stem and bonnet assembly with a rotatable bearing ring to which the stem is releasably fixed during normal gate opening and closing operations. During back seating, the stem is released from the bearing ring and the bearing ring is fixed to the bonnet cap, enabling low torque back seating by rotation of the stem relative to the bearing ring and bonnet cap.

10 Claims, 1 Drawing Sheet

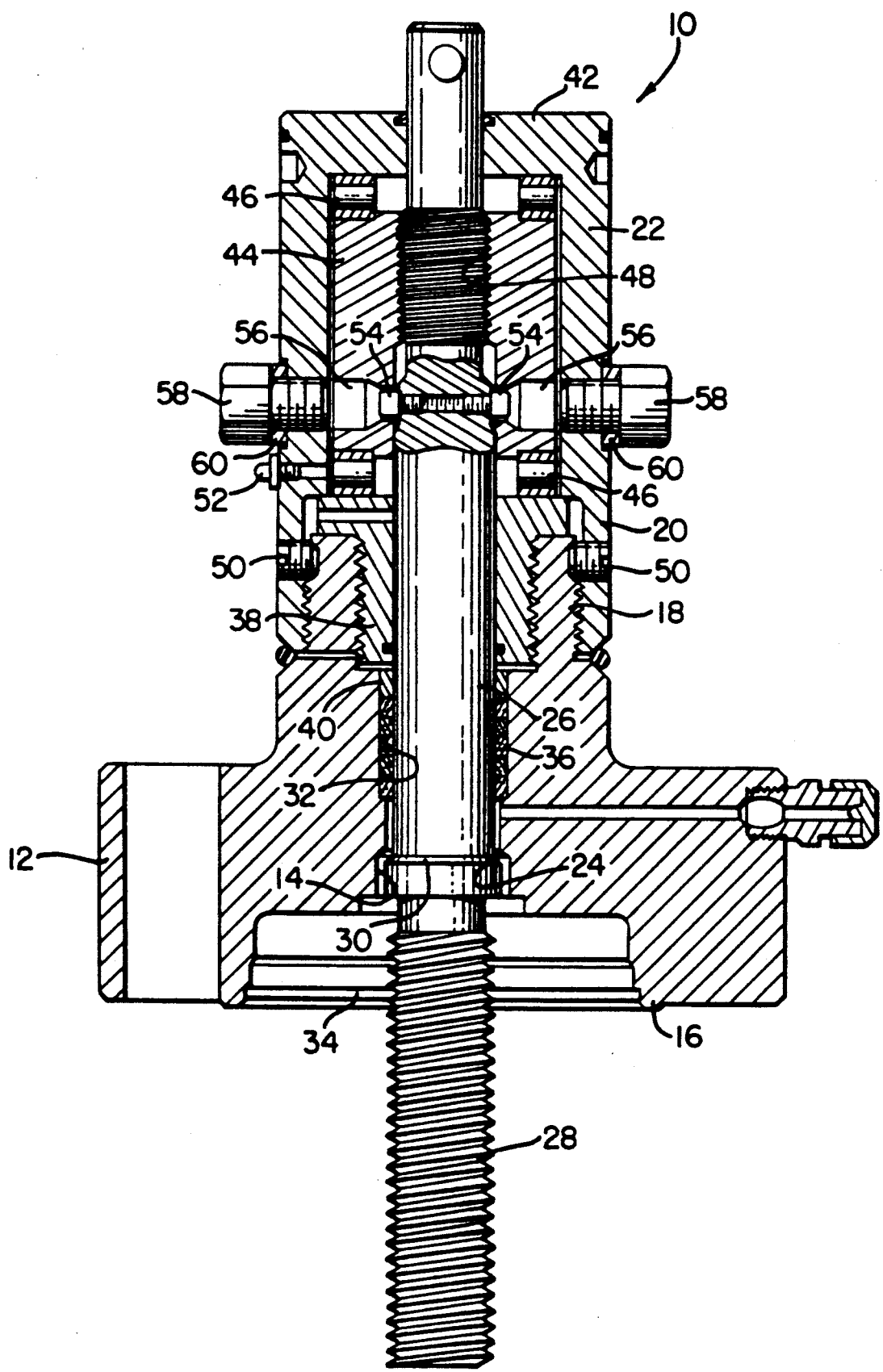

LOW TORQUE BACK SEATING STEM FOR GATE VALVE

BACKGROUND AND SUMMARY OF THE INVENTION

The present invention relates generally to gate valves and, more particularly, to gate valves adapted for stem back seating. Gate valves are commonly used to control fluid flow during drilling, completion and production phases of well operations. Typically, gate valves are operated by turning a hand wheel or other handle to actuate the gate to and from an open and closed position.

Gate valve back seating surfaces on the stem and the bonnet body serve to form a pressure seal between the stem packing chamber and the valve body chamber when replacement of the stem packing is needed. The back seating shoulder on the stem is back seated against a surface on the bonnet body. In normal gate opening and closing operations, the stem is axially fixed and raises and lowers the gate by rotation since the stem and lift nut are matingly threaded. Therefore, in order to effect back seating, the bonnet cap must usually be unscrewed to allow the stem to be moved axially upward until the backseat shoulder on the stem contacts the bonnet body. A large amount of torque is often required to loosen the bonnet cap. In many instances torque-assisting tools such as chain tongs are needed to loosen the bonnet cap. Employing such torque-assisting devices presents potential hazards and adds to costs and operational time.

It is, therefore, an object of the present invention to provide effective and practical means for low torque back seating of gate valves. The present invention achieves this objective by implementing a stem and bonnet assembly having a rotatable bearing ring to which the stem is fixed during normal gate opening and closing operations, and the bearing is then fixed to the bonnet cap and the stem is released therefrom during back seating.

BRIEF DESCRIPTION OF THE DRAWINGS

FIG. 1 is a sectional view of a low torque back seating stem and bonnet assembly in accordance with the present invention.

DETAILED DESCRIPTION OF THE PREFERRED EMBODIMENT

A low torque valve stem and bonnet assembly (10) is shown in FIG. 1. The assembly includes a bonnet body (12) having a central bore (14) therethrough. The lower end (16) of the bonnet body (12) is adapted to fit onto a gate valve body (not shown). The upper end (18) of the bonnet body (12) is adapted to be received in the lower end (20) of a bonnet cap (22). The lower end of the central bore (14) forms a back seating surface (24).

A valve stem (26) is received through the central bore (14) of the bonnet body (12). The lower end (28) of the stem (26) is threaded and adapted to mate with internal threads of a gate lifting nut (not shown). Upon rotation of the stem (26) the gate valve lifting nut is raised or lowered between open and closed positions. Adjacent the lower end (28) of the stem (26) is a back seating shoulder (30) adapted to form a pressure seal with the back seating surface (24) of the bonnet body (12) when the stem (26) is moved axially upward into a back seating position. When the stem (26) is in the back seating position the back seating shoulder (30) and surface (24) form a seal that seals off the stem packing chamber (32) from the valve body chamber (34) formed by the bonnet body (12) and the gate valve body. Stem packing (36) is received in the stem packing chamber (32) and contained by a retainer nut (38) and packing nut follower (40).

The bonnet cap (22) having a closed end (42) opposite the open lower end (20) is secured to the upper end (18) of the bonnet body (12) by threads or other suitable means, including set screws (50). A bearing ring (44) is rotatably received within the bonnet cap (22). The bearing ring (44) includes bearing assemblies (46). Grease fitting (52) are provided to lubricate the bearing assemblies (46). The bearing ring (44) has an internal bore (48) that is at least partially threaded to receive the stem (26).

During normal gate opening and closing operations the stem (26) is fixed relative to the bearing ring (44) by at least one or a plurality of small screws (54) each received in a generally radial hole (56) in the bearing ring (44) such that the small screws (54) extend into the stem (26). Whereby, turning the stem (26) causes the stem (26) and bearing ring (44) to rotate relative to the bonnet assembly and the gate lifting nut (not shown) so that the threaded engagement of the stem lower end (28) and gate lifting nut will cause axial displacement of the gate lifting nut and gate.

During backseating, the small screws (54) are removed by first removing large screws (58) which are radially received in the bonnet cap (22). Washers (60) are provided to prevent the large screws (58) from extending into the holes (56) in the bearing ring (44) during normal gate opening and closing operations. After the large screws (58) are removed, the small screws (54) are removed. The large screws (58) are then replaced without washers (60) so that the large screws (58) will extend into the holes (56) in the bearing ring (44). With the bearing ring (44) fixed with respect to the bonnet cap (22), the stem (26) is rotated and caused to move axially relative to the bonnet assembly, bearing ring (44) and gate lifting nut until the back seating shoulder (30) contacts the back seating surface (24). Once the stem (26) is back seated, a seal is formed by the back seating shoulder (30) and surface (24) to seal off the stem packing chamber (32) from the valve chamber (34) so that the stem packing (36) can be removed and replaced.

Although the best mode contemplated for carrying out the present invention has been herein shown and described, it will be apparent that modification and variation may be made without departing from what is regarded to be the subject matter of the invention.

I claim:

1. A low torque gate valve back seating stem assembly comprising:
   a bonnet body having a central bore and a back seating surface at one end;
   a stem rotatably received in said central bore and having a first, threaded end adapted to engage a threaded gate lifting nut, a second end adapted to transmit torque for rotating said stem, and an intermediate threaded section;
   a back seating shoulder on said stem for contacting said back seating surface and forming a seal therewith when said stem is positioned in a back seating position;

a bonnet cap having a closed end and an open end, said open end adapted to fit over said bonnet body at the other end of said bonnet body;

said bonnet cap having a through hole at said closed end adapted to rotatably receive said second end of said stem;

a bearing ring rotatably received within said bonnet cap and adapted to be rotatably fixed thereto;

said bearing ring having a threaded bore therethrough for receiving said stem intermediate threaded section;

means for fixing said stem relative to said bearing ring during normal gate opening and closing operations; and means for permitting axial and rotational displacement of said stem relative to said bearing ring to effect back seating.

2. A low torque gate valve back seating stem assembly according to claim 1, wherein
said bonnet cap is adapted to remain fixed to said bonnet body during back seating.

3. A low torque gate valve back seating stem assembly according to claim 1, wherein
said means for fixing said stem relative to said bearing during normal gate opening and closing operations comprises at least one small screw releasably received through a radial hole in said bearing ring and received in a hole in said stem.

4. A low torque gate valve back seating stem assembly according to claim 1, wherein
said means for permitting axial and rotational displacement of said stem relative to said bearing ring to effect back seating comprises means for fixing said bearing ring to said bonnet cap when said at least one small screw is released from said bearing ring allowing said stem to be rotated relative to said bearing ring.

5. A low torque gate valve back seating stem assembly according to claim 4, wherein
said means for fixing said bearing ring to said bonnet cap comprises at least one large screw received through a radial hole in said bonnet cap and adapted to be positioned such that a portion of said large screw extends further radially inward into said hole in said bearing ring.

6. A low torque gate valve back seating stem assembly according to claim 5, wherein
said means for fixing said stem relative to said bearing during normal gate opening and closing operations comprises two small screws.

7. A low torque gate valve back seating stem assembly according to claim 6, wherein
said means for fixing said bearing ring to said bonnet cap comprises two large screws.

8. A low torque gate valve back seating stem assembly according to claim 1, wherein
said second end of said stem is adapted to receive a handwheel or handle means for transmitting torque to said stem.

9. A method of back seating a gate valve wherein said gate valve comprises a bonnet body having a central bore and a back seating surface at one end, a stem extending through said central bore and having threads at a first end for engaging a gate lifting nut and having a second end adapted to transmit torque for turning said stem, a back seating shoulder on said stem near said first end, a bonnet cap adapted to fit over the other end of said bonnet body and having a through hole adapted to rotatably receive said second end of said stem, a bearing ring rotatably received in said bonnet cap having a central bore through which said stem extends, said bearing ring adapted to be rotatably fixed in said bonnet cap, and said stem releasably fixed in said bearing ring, said method comprising the steps of:

releasing said stem from said bearing ring such that said stem is rotatable relative to said bearing ring;

fixing said bearing ring to said bonnet cap; and rotating said stem to cause axial movement of said stem until said back seating shoulder contacts said back seating surface.

10. A method of back seating a gate valve wherein said gate valve comprises a bonnet body having a central bore and a back seating surface at one end, a stem extending through said central bore and having threads at a first end for engaging a gate lifting nut and having a second end adapted to transmit torque for turning said stem, a back seating shoulder on said stem near said first end, a bonnet cap adapted to fit over the other end of said bonnet body and having a through hole adapted to rotatably receive said second end of said stem, a bearing ring rotatably received in said bonnet cap having a central bore through which said stem extends, said bearing ring adapted to be rotatably fixed in said bonnet cap by at least one large screw extending through said bonnet cap and into said bearing ring, and said stem releasably fixed in said bearing ring by at least one small screw extending through said bearing ring and into said stem, said method comprising the steps of:

removing said at least one large screw from said bonnet cap;

removing said at least one small screw from said bearing ring;

installing said at least one large screw back through said bonnet cap and into said bearing ring;

rotating said stem to cause axial movement of said stem until said back seating shoulder contacts said back seating surface.

* * * * *